(12) United States Patent
Nitsche

(10) Patent No.: US 7,055,405 B1
(45) Date of Patent: Jun. 6, 2006

(54) TRANSMISSION ASSEMBLY AND CONTROL PLATFORM TO BE USED IN A TRANSMISSION ASSEMBLY

(75) Inventor: Martin Nitsche, Gerstetten (DE)

(73) Assignee: Voith Turbo GmbH & Co. KG (DE)

( * ) Notice: Subject to any disclaimer, the term of this patent is extended or adjusted under 35 U.S.C. 154(b) by 191 days.

(21) Appl. No.: 10/111,350

(22) PCT Filed: Oct. 20, 2000

(86) PCT No.: PCT/EP00/10344

§ 371 (c)(1),
(2), (4) Date: Sep. 17, 2002

(87) PCT Pub. No.: WO01/29454

PCT Pub. Date: Apr. 26, 2001

(30) Foreign Application Priority Data

Oct. 22, 1999 (DE) ................ 199 50 967

(51) Int. Cl.
*F16H 57/04* (2006.01)
(52) U.S. Cl. .................... 74/606 A; 74/606 R
(58) Field of Classification Search .......... 74/606 R, 74/606 A; 165/41–43, 200, 202
See application file for complete search history.

(56) References Cited

U.S. PATENT DOCUMENTS

| | | | |
|---|---|---|---|
| 4,805,490 A | * | 2/1989 | Fuehrer et al. .......... 74/606 R |
| 5,305,663 A | | 4/1994 | Leonard et al. ............... 74/866 |
| 5,662,007 A | * | 9/1997 | Starker et al. ............ 74/606 A |
| 5,941,137 A | * | 8/1999 | Beer et al. ................ 74/606 R |
| 6,205,887 B1 | * | 3/2001 | Barnreiter et al. ........ 74/606 R |
| 6,488,601 B1 | * | 12/2002 | Sommer et al. ............. 474/70 |

FOREIGN PATENT DOCUMENTS

| | | | |
|---|---|---|---|
| DE | 4134369 | 4/1992 | |
| DE | 4041253 | 6/1992 | |
| DE | 4344584 | 6/1995 | |
| DE | 19517491 | 11/1996 | |
| DE | 19710931 | 10/1997 | |
| EP | 0373849 | 6/1990 | ...... 41/8 |
| EP | 0443638 | 8/1991 | |
| EP | 1054192 | 11/2000 | |
| WO | 97/29306 | 8/1997 | |

OTHER PUBLICATIONS

"Hydrodynamics in Drive Technology" pp. 151 to 195.

* cited by examiner

*Primary Examiner*—Vicky A. Johnson
(74) *Attorney, Agent, or Firm*—Ostrolenk, Faber, Gerb & Soffen, LLP

(57) ABSTRACT

The invention relates to a transmission construction unit having a transmission housing, an electronic control apparatus assigned to the unit and having at least one electronic control device, and a hydraulic control apparatus. The electronic control device and the hydraulic control apparatus are arranged in the transmission housing in direct spatial proximity to one another on a joint carrying device.

6 Claims, 4 Drawing Sheets

TRANSMISSION ASSEMBLY AND CONTROL PLATFORM TO BE USED IN A TRANSMISSION ASSEMBLY

FIELD OF THE INVENTION

The invention relates to a transmission construction unit. Furthermore, the invention relates to a control platform for use in a transmission construction unit.

SUMMARY OF THE INVENTION

Transmission construction units, in which the change between the individual gear states in specific driving situations is made automatically as a function of variables at least indirectly describing the current driver's wish and/or the current driving situation, are known in a multiplicity of versions. These are designed, for example, as converter transmissions, comprising at least one hydrodynamic converter and mechanical rotational-speed/torque conversion devices, such as is described, for example, in the Voith publication: "Hydrodynamik in der Antriebstechnik" ["Hydrodynamics in drive technology"], Vereinigte Fachverlage, Krauskopf Ingenieur Digest, Mainz 1987, pages 151 to 195. For the optimum adaptation of the transmission behavior, the transmission construction unit is assigned a control apparatus for the electronic activation of the individual rotational-speed/torque conversion devices. In this case, the activation and operation of the actuating devices for changing the functioning are normally carried out hydraulically by means of a hydraulic control apparatus which may be integrated at any desired point in the transmission. As regards coupling between the electric and the hydraulic control apparatus, there are therefore a multiplicity of possibilities which, in addition to the different construction space requirement, necessitate a considerably larger line length. According to the versions of the prior art, the transmission control apparatus is arranged separately from the housing of the automatic transmission in the vehicle. Since the housings of the transmission construction unit and of the control apparatus are normally produced at different locations and are operatively connected to one another only during assembly in the vehicle, in each case randomly selected transmission construction units are connected to a randomly selected electronic control apparatus. Even when gear step-up or change-over characteristic curves show a particular change or deviation in their initial characteristic in relation to a cut-in ratio of a magnet coil used for controlling the gear change, it may therefore not be possible to correct these variations with the aid of the electronic control apparatus.

In addition to transmission control apparatuses of this type, which are structurally independent, transmission control apparatuses are also known which are integrated into the vehicle management system, as described, for example, in the publication EP 0 373 849 A2.

One disadvantage of the known transmission control apparatuses is that, for transmissions of the same type, the controls are always set identically, in order, for example, to ensure easy exchangeability, that is to say specific tolerances cannot be ruled out. Transmission control apparatuses of this type are therefore not tuned to the transmission construction unit installed individually in the vehicle. If, on the other hand, the transmission control apparatus is tuned to a transmission construction unit, the control, for example the ECU, has to be reprogrammed correspondingly when the transmission is exchanged. This is highly labor-intensive.

Furthermore, the transmission control apparatuses known from the prior art are characterized in that, in order to make the necessary electric connections, for example the electric connections between specific sensors detecting variables characterizing the current driving situations and/or sensors for detecting the driver's wish and an overriding control apparatus and/or the transmission control apparatus and the actuators which, as a rule, comprise a hydraulic control apparatus, a multiplicity of plug connections and lines have to be provided. Consequently, because of the large number of possible fault sources, systems of this type have relatively low reliability. Also, the individual elements of the transmission control apparatus and their coupling to the hydraulic control apparatus require corresponding construction space, and these elements cannot be exchanged in a simple way for elements of a different design.

The object of the invention is, therefore, to develop a solution for a transmission construction unit which avoids the disadvantages presented above and by means of which easily exchangeable units, in particular of the individual control apparatuses, both hydraulic and electric, are possible at as low an outlay as possible. The solution according to the invention is at the same time to be distinguished by a low outlay in structural and manufacturing terms.

According to the invention, in a transmission construction unit, comprising a transmission housing, a hydraulic control apparatus and an electronic control apparatus assigned to the transmission construction unit and comprising at least one electronic control device, the electronic control device is arranged in the transmission housing in direct spatial proximity to the hydraulic control apparatus. By electronic control device is meant, in this context, the control appliance or a unit of electric and electronic structural elements, to which the variables necessary for activating the transmission construction unit are fed and are processed in this, and which outputs regulating variables formed from the input variables according to the desired activation operation. The control device comprises, as a rule, a plurality of electric and electronic structural elements which are assigned to one another according to the processing of the input variables which is to be carried out and are coupled to one another. Preferably, a plurality of the electric and/or electronic structural elements are arranged jointly on at least one carrier plate and are surrounded by a control device housing. In this case, there is the possibility that the carrier plate is integrated completely in the control device housing or else forms at least one part wall region of the control device housing.

The electronic control apparatus comprises, in addition to the control device, devices for detecting the input variables and means for coupling the devices to the control device, furthermore means for coupling to the corresponding regulating elements for actuating the regulating devices which are assigned to the individual transmission elements of the transmission construction unit for changing the functioning or operating mode. Since the regulating devices in the form of actuators may also be an integral part of the hydraulic control apparatus, the coupling means may then be assigned both to the electronic and to the hydraulic control apparatus.

According to a further aspect of the invention, the entire electronic control apparatus is integrated in the transmission housing and is arranged in direct spatial proximity to the hydraulic control apparatus. This means that a plurality of, preferably all the devices for detecting one of the variables at least indirectly characterizing the driving situation and/or the functioning mode of the transmission construction unit are also integrated in the transmission construction unit and are arranged in spatial proximity to the hydraulic control apparatus.

By hydraulic control apparatus are meant, in this context, the hydraulic connections between the means of detection of an input variable and/or the electric control apparatus and the regulating devices which, as a rule, are acted upon hydraulically by a pressure, and the elements functioning as actuators and their coupling to the regulating elements. Included at the same time are essentially all the elements to be actuated which are necessary for actuating or setting the individual gear stages.

The solution according to the invention affords the advantage of increased reliability, since the number and length of the line connections necessary for electric coupling are considerably smaller, as compared with conventional solutions, due to the integration of the control apparatus in the housing. Furthermore, by the electronic control apparatus being arranged in the transmission construction unit, individual adjustment of the control apparatus to the respective transmission construction unit is possible, without a reprogramming of the control device having to be carried out in the event of an exchange of the transmission construction unit. The unequivocal assignment of the transmission construction unit and electric control apparatus makes it possible to simplify the logistics. The structural integration of the electronic and hydraulic control apparatus in the transmission construction unit makes it possible to provide a testable unit of the control apparatus, control hydraulics, actuator technology and sensor technology of the transmission construction unit, the control apparatus being capable of being adapted to the transmission-specific tolerances even during the test operation.

Preferably, the electronic control device and the hydraulic control apparatus are arranged, in the installation position, below the axis of symmetry of the transmission. This affords the advantage that both elements are easily accessible and exchangeable.

There is a multiplicity of possibilities as regards the two control apparatuses, electronic control apparatus and hydraulic control apparatus, being arranged spatially near to one another. It may be envisaged, in this case, to have a) an arrangement of the hydraulic control apparatus and electronic control device or electronic control apparatus next to one another in the horizontal direction and in one plane, that is to say without offset, in the vertical direction;
b) an arrangement of the hydraulic control apparatus and the electronic control device or control apparatus next to one another in the horizontal direction and offset to one another in the vertical direction;
c) an arrangement one above the other in the horizontal direction.

Preferably, in this case, each of the control apparatuses or devices—electronic control device and hydraulic control apparatus—is assigned a corresponding carrier element, said carrier elements being capable of being connected to one another to form a carrying device, so that a structural unit comprising at least the electronic control device and the hydraulic control apparatus can be formed. This can be removed as a whole from the transmission construction unit in a simple way. A further possibility is to arrange both, the electronic control device of the electronic control apparatus and the hydraulic control apparatus, on a central carrier element and likewise to form a structural unit. In both cases, the entire structural unit consisting of carrier element or carrier elements, hydraulic control apparatus and electronic control device is designated as a control platform which can be offered as a handleable structural unit.

According to the invention, a cooling device is assigned to the fuel and/or control-means and/or lubricant circuit of the transmission construction unit and is integrated in the transmission housing. This cooling device may be designed in various ways, but, as a rule, comprises either at least one cooler, one or more cooling elements and/or a heat exchanger. In this case, the cooling device is arranged preferably next to or above or below at least one of the two apparatuses—electronic control apparatus or electronic control device or hydraulic control apparatus—or between the two. Optimum cooling of the electronic structural unit can therefore additionally be achieved.

To provide a particularly compact structural unit or for the particularly simple routing of the hydraulic fluid, the hydraulic control apparatus comprises a duct plate for the routing of oil for the hydraulic control, said duct plate being formed by the closing plate of the cooler or cooling device. According to a further aspect, the housing of the cooling device may be formed additionally from the oil pan of the transmission construction unit and the duct plate of the hydraulic control. This affords the advantage that, since these parts are present in any case in an automatic transmission, a separate housing for the cooling device can be dispensed with. In a particularly advantageous version, during the shaping of the oil pan, the housing of the cooling device is also shaped in such a way that the oil in the oil pan cannot enter the housing of the cooling device and, furthermore, the housing for the cooling device is designed to be downwardly open in the installation position, so that the housing is closed as a result of the introduction of the control platform. In this case, simple exchangeability of the entire electronic and hydraulic control apparatus together with cooling devices is possible without a high outlay in terms of assembly.

A further considerable advantage in the integration of the cooling device into the transmission construction unit is that complicated hose connections or pipe connections between the transmission and the cooling device may be dispensed with, as well as mountings by means of which the cooling device has to be fastened to the transmission construction unit.

In this case, when the transmission construction unit is in the installation position, the cooling device is integrated into the oil pan in such a way that there is no need for any enlargement of the outer transmission contour, as compared with the conventional known solutions. An essential advantage of integration of this kind is that the overall transmission construction unit can be fitted optimally and more easily into the increasingly smaller or available installation spaces.

Preferably, the cooling device, electronic control apparatus and hydraulic control apparatus are arranged on a common carrier element or else each on its own carrier element, said carrier elements being capable of being assembled together with one another to form a structural unit, and form what may be referred to as a control platform. Preferably, furthermore, a large part of the detection devices, as a rule designed as sensors, for determining the input variables of the transmission construction unit which are to be processed in the control apparatus or device is also arranged on the control platform or is integrated in the latter, in order to provide an even more compact structural unit which can easily be exchanged. In this case, the control apparatus would likewise be arranged almost completely on the carrier element.

According to a further aspect of the invention, in addition, further structural elements, for example an oil pump with a suction filter, a fine filter and all the oil connections and also the necessary sensors, are arranged on the control platform. This arrangement allows the complete cabling of all the actuators and sensors and separate testing of all the sensors and actuators, including the oil supply of plug connections, irrespective of the integration of these functional elements into the transmission construction unit.

According to a further aspect of the invention, the electronic control apparatus is assigned a housing which is designed preferably to be tight to hydraulic fluid, for example oil and/or another fluid. The control device may then likewise be arranged in the oil sump of the transmission construction unit. There is thereby the possibility of exposing the electric and electronic structural elements of the control device to at least indirect cooling by the fuel located in the fuel or oil sump of the transmission construction unit. However, in order to make the electric connection between the control device and the sensors of the control apparatus, which are necessary for detecting the variables at least indirectly characterizing the current driving situation and/or the driver's wish and/or further boundary conditions, and the actuators, to be activated by means of the control apparatus, for actuating the individual elements of the transmission construction unit, for example in order to carry out the gear change and/or to stipulate input variables by means of an overriding control or regulating apparatus, the oiltight design of the housing makes it necessary to have a correspondingly configured leadthrough on the housing. Preferably, in this case, the individual contact elements or lines are led, embedded in an electrically nonconductive and fluidtight material, through the control device housing, so that the penetration of harmful substances such as, for example, oil, is prevented.

The arrangement of the control device in the, in the installation position, lower region of the transmission construction unit and the provision of a corresponding housing make it possible to arrange the sensors for detecting the individual variables at least indirectly describing the operating mode of the individual elements of the transmission construction unit at a specific time likewise in the region below the transmission center line, which corresponds to the axis of rotation, and therefore to make the entire control apparatus relatively compact. The described arrangement in the oil sump, which, as a rule, is accumulated in an oil pan which is formed by the lower part of the transmission, makes it possible, furthermore, in a simple way to demount the control apparatus, complete with the associated control hydraulics, the actuator technology for actuating the individual shift elements and the sensors which, as a rule, are arranged on the housing of the oil pan, and to test it separately as an entire unit for functioning capacity, if appropriate additionally under specific predefinable conditions.

To ensure the connection between the elements coupled to the control device, such as sensors, actuators and/or a further control apparatus, the connection between the individual contacts and the control device, in particular the electric structural elements arranged on the carrier plate in the form of an electronic board, is made in such a way that these contacts are designed as spring contacts, so that the springs press the contacts onto the contact points of the electronic board. Alternately, connections by means of soldered-on or welded wires or in the form of pluggable connections may be produced.

The electric connections between the sensors, actuators and control device of the transmission construction unit may be designed in the form of
a) flexible cable connections and/or
b) rigid conductor tracks consisting, for example, of copper.

As a rule, in this case, flexible cable connections are preferably used, since these can be adapted in a simple way with regard to line routing.

In order to prevent thermal overloading of the electronic control apparatus due to the generation of heat in the transmission construction unit, there is advantageously provision for the electronic control device, which is integrated in the housing of the transmission construction unit, to be uncoupled thermally from said housing, for example by means of a heat-insulating intermediate layer. The housing of the electronic control device is in this case, for example when arranged in the oil sump of the transmission construction unit, protected relative to the oil sump by means of a heat-insulating medium against an excessive transfer of heat from the hot oil to the electronic structural elements. In this respect, there is a possibility either of providing the housing with a coating consisting of a heat-insulating medium or else of manufacturing parts of the housing wall from a heat-insulating material.

It is particularly advantageous, furthermore, not only to uncouple the electronic control device thermally from the transmission construction unit, but also vibrationally, for example by the electronic control device being suspended, vibration-damped, in the transmission construction unit.

In a further developed embodiment, the control device is assigned means for the at least indirect discharge of heat from the electric structural elements of the control device. These means function on the principle of heat conduction or heat transfer. In the first-mentioned case, for example, the carrier plates carrying the electronic structural elements are connected highly heat-conductively to the bottom of the housing of the control apparatus. Preferably, for this purpose, a connection which allows heat conduction is selected. This may be implemented, for example, by means of an adhesive connection. Another possibility for the discharge of heat by at least indirect cooling is to provide coolant-routing ducts which, by virtue of the transfer of heat from the electronic structural elements to the coolant, discharge the heat from the electronic structural elements. The cooling ducts may in this case be separate ducts in the form of tubular elements or lines. Preferably, however, the cooling ducts are incorporated directly into the wall of the housing of the control device. In this case, there is a possibility that, for example, as seen in the installation position in the transmission construction unit, the bottom and/or the side walls and/or the top side of the housing form the cover of a cooling-water duct or of a cooling-water forward flow. There is a multiplicity of possibilities with regard to the arrangement of the coolant ducts or of the coolant lines. These may, for example, be an integral part of
a) an independent cooling circuit assigned to the control apparatus of the transmission unit,
b) the cooling circuit assigned to the transmission construction unit,
c) a cooling circuit assigned to another element in the vehicle,
d) the vehicle cooling circuit.

It may also be envisaged to couple the separate cooling circuit of the control device of the transmission construction unit to other cooling circuits in the vehicle. To reduce the number of components and the length of the lines to be provided for the purpose of cooling individual assemblies, the coolant ducts or the coolant lines of the control device of the transmission construction unit are preferably integrated in a coolant circuit to be previously provided.

The electronic control device comprises at least one input which can be coupled to the sensors provided for the at least indirect detection of an actual value of a variable for a current driver's wish and/or other driving situation and/or a further control apparatus. Furthermore, at least one output is provided, which can be coupled to the actuators, for example in the form of control hydraulics for the actuation of shift elements. When the housing of the control device is arranged in the oil sump of the transmission construction unit and the housing of the control device has an oiltight design, corresponding apparatuses for the leadthrough of electric line connections or cables are to be provided. The cable leadthrough apparatus for implementing a transition of cables from a region of space at least partially filled with a lubricant or fuel or the like, or containing residues and at least partially surrounded by a housing, to outside the region of space, comprises an insulating body for the leadthrough of the cable elements, which consists of electrically nonconductive material and of an electrically nonconductive material impermeable to fluids.

The solution according to the invention makes it possible, furthermore, to provide a control platform as a structural unit which contains the hydraulic control apparatus, the electric control apparatus and the cooling device, including the actuators and sensors and also the oil circuits. For this purpose, these elements are arranged on a common carrying device, which may also be formed from a plurality of carrier elements, and are preferably capable of being integrated in the transmission housing of a transmission construction unit in the oil pan. As already stated elsewhere, this solution affords the advantage of providing testing of the hydraulics and of the functioning of the electronic control, said testing being capable of being carried out, complete and self-contained, without integration into the transmission construction unit.

BRIEF DESCRIPTION OF THE DRAWINGS

The solution according to the invention is explained below with reference to figures, of which, presented in detail.

DETAILED DESCRIPTION OF THE DRAWINGS

Figure 1:
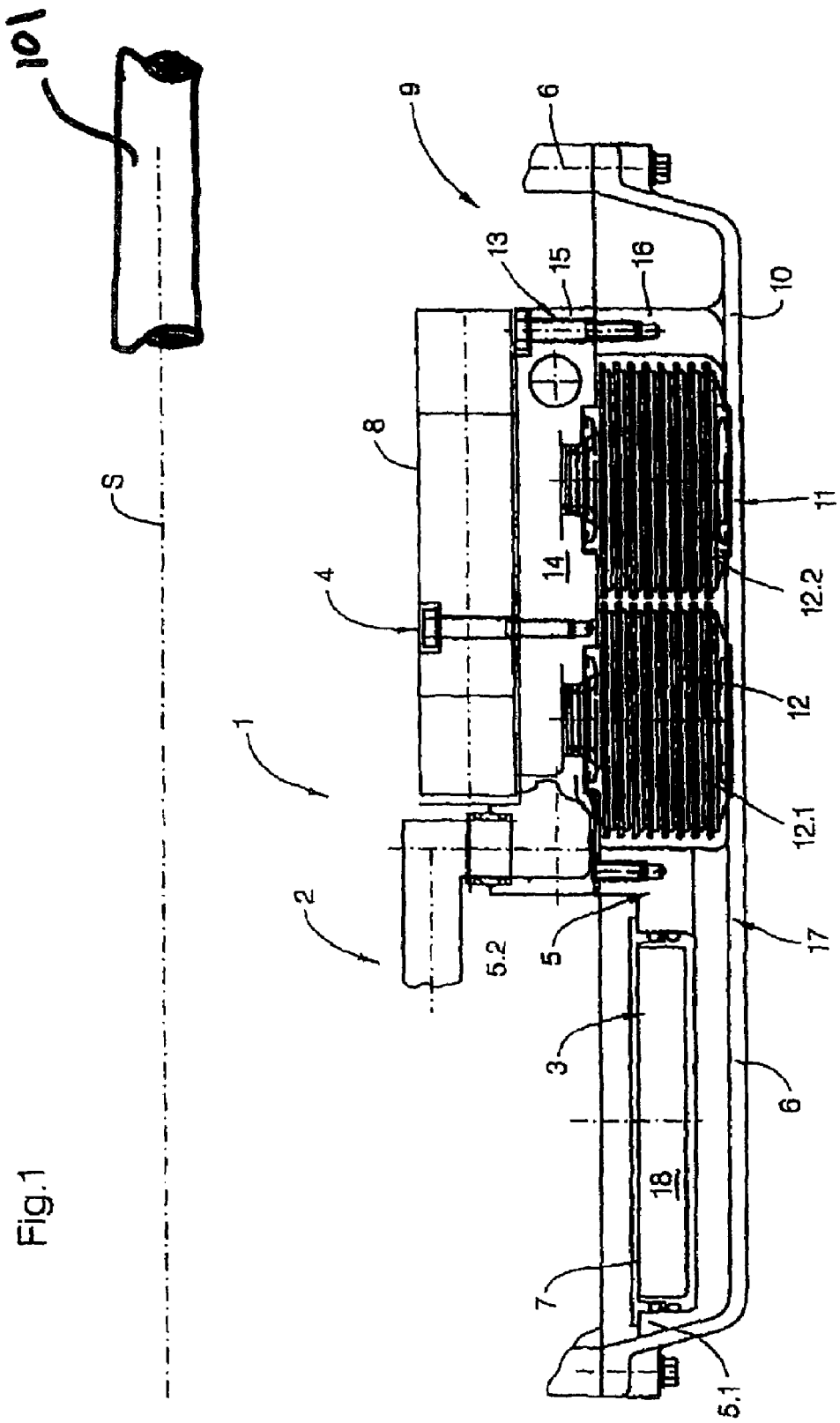
FIG. 1 illustrates, by means of a detail, a transmission construction unit designed according to the invention, with a hydraulic and electronic control apparatus.

FIG. 1 illustrates, in a diagrammatically simplified presentation, a detail of a transmission construction unit 1, to which a control system 2 is assigned in order to implement different operating modes, in particular of the individual gear changes. For the sake of a simplified presentation, no elements of the transmission construction unit 1, in particular for implementing power transmission, are reproduced. The control system 2 comprises an electronic control apparatus 3 and a hydraulic control apparatus 4. The electronic control apparatus 3 and the hydraulic control apparatus 4 are in this case, according to the invention, arranged in direct spatial proximity to one another. Preferably, arrangement takes place below the axis of symmetry S of the transmission. In this case, in the version presented, the arrangement of the electronic control apparatus 3 and of the hydraulic control apparatus 4 in direct spatial proximity to one another is designed in such a way that, as seen in the installation position, said apparatuses are arranged essentially next to one another in the transmission construction unit 1. In the case presented, as seen in the installation position, the hydraulic control apparatus is arranged so as to be offset to the electronic control apparatus 3 in the vertical direction. There is, however, also the possibility, not presented here, of arranging the electronic control apparatus 3 and the hydraulic control apparatus 4 in a common plane. In this case, in a preferred version, the electronic control apparatus 3 and the hydraulic control apparatus 4 are mounted at least indirectly on a jointly useable carrier element 5. The carrier element 5 may in this case have a one-part or multipart design. In the case presented, the latter has an at least two-part design and comprises at least one first carrier subelement 5.1 and one second carrier subelement 5.2. In this case, the first carrier subelement 5.1 serves for mounting the electronic control apparatus 3, while the hydraulic control apparatus 4 is arranged on the second carrier subelement 5.2. The two carrier subelements 5.1 and 5.2 are capable of being connected releasably to one another to constitute a structural unit in the form of the carrier element 5.

The carrier element 5 carrying the electronic control apparatus 3 and the hydraulic control apparatus 4 is integrated in the housing 6 of the transmission construction unit 1 below the axis of symmetry S of the transmission construction unit 1. Preferably, the electronic control apparatus 3 and the hydraulic control apparatus 4 each have their own housing 7 and 8, and this may likewise be formed by the housing 6 of the transmission construction unit. The carrier element 5 and therefore the control system 2 may then be arranged in the region of a fuel or oil sump 9 in the housing 6 of the transmission construction unit 1. There is, at the same time, the possibility that the carrier element 5 can be fastened in the wall region of an oil pan 10. It may also be envisaged, if the carrier element 5 is of suitable design, to have possibilities for mounting or fastening on housing elements of the housing 6 of the transmission unit 1 outside the oil pan 10 which, when the transmission unit 1 is in the mounted state, is an integral part of the housing 6 of the transmission construction unit 1.

According to a further aspect of the invention, the control system 2 is assigned a cooling device 11. The cooling device 11 is likewise integrated in the transmission housing 6. In the particularly advantageous embodiment according to FIG. 1, the cooling device 11, which comprises at least one cooler 12, is integrated in the oil pan 10. Means 13 for thermal coupling of the cooling device to the control system 2 are provided. In this case, the means for thermal coupling 13 comprise at least one duct plate 14 for routing oil to the hydraulic control or control apparatus 4, said duct plate being coupled to a closing plate 15 of the cooling device 11. Preferably, the duct plate 14 is designed at the same time as a closing plate 15 of the cooling device 11. The closing plate 15 or the duct plate 14 is then an integral part of a housing 16 of the cooling device 11. Furthermore, in the case presented, this housing 16 is formed partially by the oil pan 10. In this case, the duct plate 14, which is preferably designed at the same time as a closing plate 15 of the cooling device 11, comprises at least one, but preferably a plurality of ducts for routing the fuel of the hydraulic control apparatus 4. Cooling in this case takes place directly or indirectly by heat conduction or heat transfer. Preferably, the cooling device 11 is in the form of a heat exchanger which may be designed differently in terms of its structural configuration and the implementation of functioning. The cooling device 11 is in this case dimensioned such that no enlargement of the outer contour of the transmission construction unit, as compared with conventional versions, is obtained. It thereby becomes possible for the transmission construction unit 1 designed according to the invention, together with a control platform 17 designed according to the invention, which is formed by the carrier element 5 and carries the control system 2, to be integrated into increasingly smaller installation spaces. Furthermore, by the arrangement of the cooling device 11 in the oil pan 10 being stipulated, the possible number of variants in terms of possible cooler positions is reduced considerably. Moreover, additional hose or pipe connections between the transmission construction unit 1 and the cooling device 11 may be dispensed with. This also applies to mountings which may be necessary and by means of which the cooling device 11 has to be fastened to the transmission construction unit 1, in particular the housing 6. The cooling of the electronic control apparatus 3 is in this case carried out preferably in such a way that the coolant forward flow, not presented here, to the cooling device 11, in particular to the individual coolers 12.1 and 12.2 designed as heat exchangers, is arranged in the housing 7 of the electric control apparatus. Preferably, the forward-flow duct is arranged in a housing wall of the housing 7 of the electronic control apparatus 3, in which case the forward-flow duct may be routed on the bottom, side or top side of the housing 7.

A further possibility is the complete encasing of the electronic control and the thermal tie-up of the casing to the water-routing housing wall of the cooling device. The casing is separated from the rest of the transmission by air gaps. To reduce the mechanical stress caused by vibrations, the casing is mounted in the transmission by means of damping elements.

Figure 2:
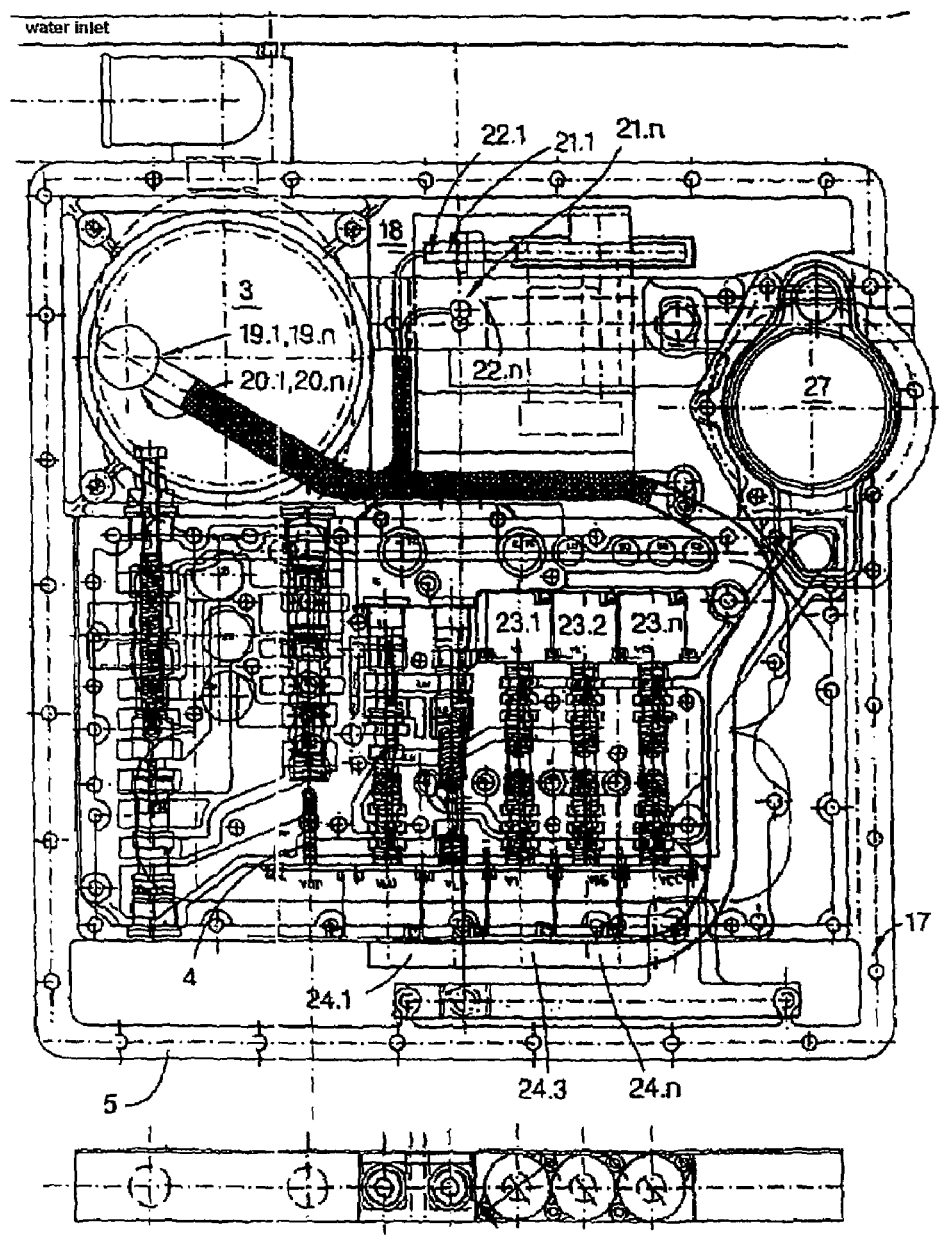
FIG. 2 illustrates, in a diagrammatically simplified presentation, the setup of a control platform for integration according to the invention into the transmission construction unit, in a top view.

FIG. 1 illustrates, in a diagrammatically simplified presentation, by means of a detail of a transmission construction unit 1, a preferred version of the arrangement according to the invention of electronic control apparatus 3 and hydraulic control apparatus 4 spatially near to one another, preferably together with the cooling device 11 additionally provided. However, the solution according to the invention is not restricted to this version. Other arrangement possibilities may be envisaged. Furthermore, there is a multiplicity of possibilities with regard to the actual embodiment of the electronic control apparatus 3 and hydraulic control apparatus 4. For this purpose, the electronic control apparatus 3 comprises at least one electronic control device 18 which has at least one input 19 and at least one output 20. This is evident, for example, from FIG. 2 in a top view of a control platform 17 configured according to the invention. In this case, the inputs 19.1 to 19.N are coupled to devices 21.1 to 21.N for the at least indirect detection of the current driving situation and/or a current driver's wish after a variation in the current driving situation and/or in the operating mode of the transmission construction unit. The devices 21.N are designed preferably in the form of sensors which convert the variables at least indirectly characterizing the driving situation and/or the current driver's wish and/or the operating mode into corresponding electric signals for processing in the electronic control device. The control device 18 in this case processes the signals present at the inputs 19.1 to 19.N and correspondingly forms the regulating signals for activating the regulating elements for changing the operating mode of the transmission construction unit 1. The regulating signals in this case form the input variables of the hydraulic control apparatus 4. For this purpose, the hydraulic control apparatus 4 comprises at least one, preferably a plurality of hydraulic control devices 23.1 to 23.N which likewise have at least one input 24.1 to 24.N, the inputs 24.1 to 24.N being coupled to the outputs 20.1 to 20.N of the electronic control device 18 of the electronic control apparatus 3. The regulating signal or regulating signals output at the output 20.1 or in the outputs 20.1 to 20.N are used as a control signal or control signals for the hydraulic control apparatus 4. Via the hydraulic control device 4, for example in the form of at least one electromagnetically actuable valve device, the control signal or control signals is or are used for activating the regulating elements 23.1 to 23.N in order to change the operating mode of the transmission construction unit 1. These regulating elements 23.1 to 23.N are designated as actuators. These serve, for example, for actuating individual clutch and/or brake devices of the transmission construction unit 1 which are to be actuated in order to implement a gear change. Preferably, in this case, all the elements of the electronic control apparatus 3 and of the hydraulic control apparatus 4 are arranged on the carrier element 5. It thereby becomes possible to achieve a complete cabling of all the actuators 23.1 to 23.N and/or sensors 22.1 to 22.N to the electronic control device 18, thus affording the possibility of conducting a separate test of the complete unit comprising sensors, actuators, including oil supply and plug connection. The hydraulic control apparatus 4 is preferably designed in such a way that all the elements are likewise arranged with optimum space utilization in relation to one another. It thereby becomes possible for the entire hydraulic control 4 of the transmission construction unit 1, which may comprise, for example, a hydrodynamic rotational-speed/torque conversion device, shift elements and a retarder, to be combined in a single housing. The hydraulic transitions to the transmission construction unit 1 and/or the design of the sensors 22.1 to 22.N are in this case such that the mounting of the complete structural unit, that is to say of the control platform 17, can take place from below, that is to say below the axis of symmetry S of the transmission, as seen in the installation position of the transmission construction unit 1. Sealing is then carried out by means of insertable tubes or similar seals. After the removal of the control platform 17, therefore, all the structural elements in the vehicle which are arranged above the carrier element 5, in particular above the control platform 17, can be maintained independently without the transmission being demounted. Preferably, for this purpose, the cooling device 11, all the necessary detection devices 21.1 to 21.N, all the fuel or control-means or lubricant connections and also additional elements, such as oil pump and suction filter, are arranged on the control platform 17 next to the electronic and hydraulic control apparatus.

In addition to the reduction in the length of the line connection necessary for electric coupling, in particular between the individual devices for the at least indirect detection of a variable at least indirectly describing the current driving situation and/or the operating mode of the transmission construction unit and/or a driver's wish, the electronic control apparatus and also the electronic control apparatus and the actuators, construction space to be made available can be reduced considerably. Furthermore, by the electronic control apparatus being arranged in the transmission construction unit 1, individual adjustment of the control apparatus to the respective transmission construction unit is possible, without a reprogramming of the control device having to be carried out in the event of an exchange of the transmission construction unit 1. The unequivocal assignment of transmission construction unit and electronic control apparatus makes it possible to simplify the logistics. Moreover, due to the integration of the electronic control apparatus into the transmission construction unit 1 and to the direct spatial arrangement of the electronic control apparatus 3, it becomes possible to provide a testable unit of electronic control apparatus, hydraulic control apparatus, including actuator technology and sensor technology, of the transmission construction unit 1, the individual control apparatuses, electronic control apparatus and/or hydraulic control apparatus, being capable of being adapted to the transmission-specific tolerances even during the test operation.

Figure 3:
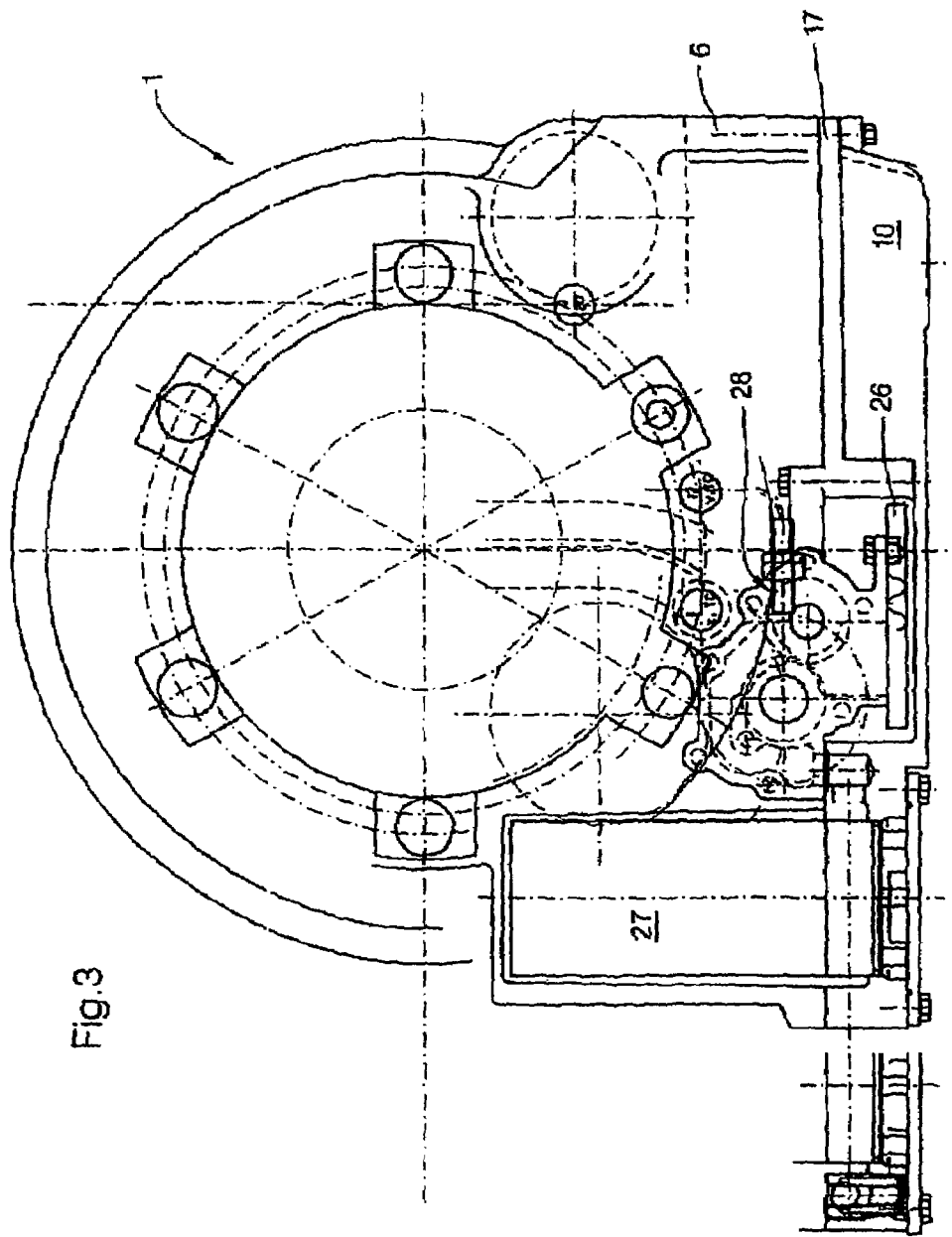
FIG. 3 illustrates a view of the transmission construction unit according to FIG. 1 from the right.

According to a further aspect of the invention, further devices are integrated in the control platform 17. These may be considered to be, for example, an oil pump with suction filter 26 and a fine filter 27. This becomes clear from FIG. 2 in a top view of a control platform 17 configured according to the invention and from FIG. 3 in a view of a transmission construction unit according to FIG. 1 from the right. Furthermore, a gear pump 28, such as is used for the supply of fuel in transmission construction units 1, can be seen.

The version according to the invention, presented in FIG. 1, constitutes a preferred particularly advantageous embodiment of a control platform 17. However, the invention is not restricted to this actual version. Other design possibilities may likewise be envisaged, which make use of the basic idea of the direct spatial arrangement of the electronic control apparatus 3 and hydraulic control apparatus 4, preferably both being arranged on a common carrier element 5.

Figure 4A:
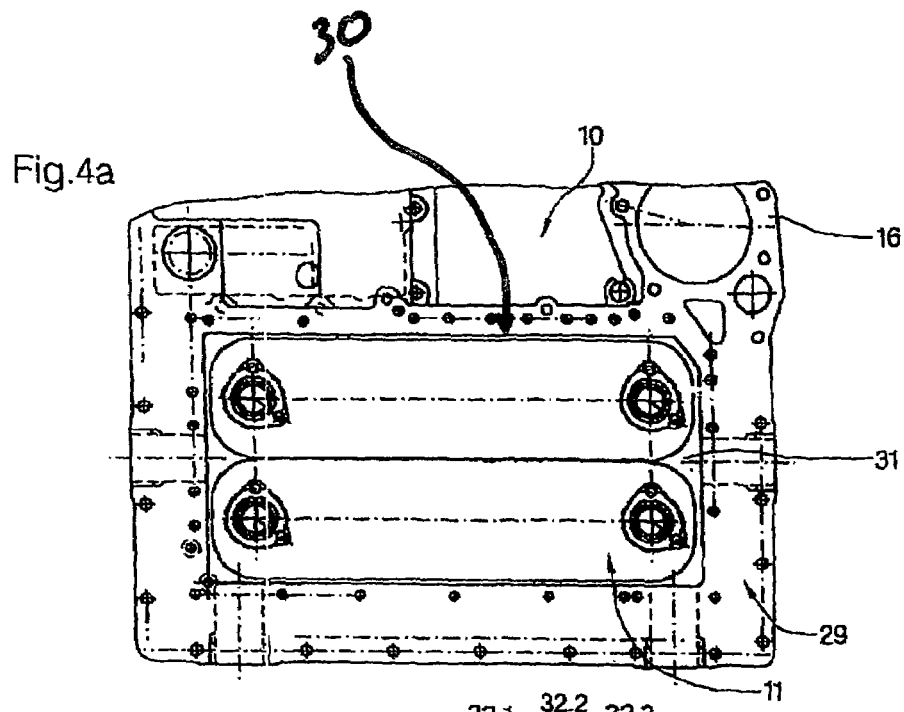
FIGS. 4a to 4c illustrate in each case a top view of the oil pan with inserted cooling elements, of the duct plate and of a water box which is closed by means of the duct plate and in which the cooling device is integrated.

FIG. 4a illustrates, in a top view, a view of the oil pan 10 and the part, shaped out of this, for receiving the cooling device 11. In this case, the housing of the oil pan 10 may be formed, for example, by the transmission housing. It is also conceivable, however, for the oil pan to be designed as a separate housing lower subelement which then, in the installation position, is mounted together with the remaining transmission housing. The shaping of the wall regions 29 to form the housing 16 of the cooling device may in this case be carried out in such a way that a chamber 31 for receiving the cooling elements or cooling device 11 is produced, by the appropriate provision of an intermediate wall 30, in an oil pan 10 closed on one side. A further possibility, not presented in detail here, is to leave the underside, not presented in detail here, open in the region of the chamber 31 in order to receive the cooling device 11 on this underside and additionally to assign to the cooling devices a closing plate which then closes the oil pan 10 from below in the region of the chamber 31. Particularly when the electronic control apparatus 3 and the hydraulic control apparatus 4 are arranged on a common carrying element 5, this solution is particularly advantageous, since it allows exchangeability without the complete separation of the oil pan from the remaining transmission housing 16, in that, only if necessary, both the cooling device 11 and the control platform 17 then arranged above it in the installation position, together with the electronic control apparatus 3 and the hydraulic control apparatus 4, can be exchanged.

Figure 4B:
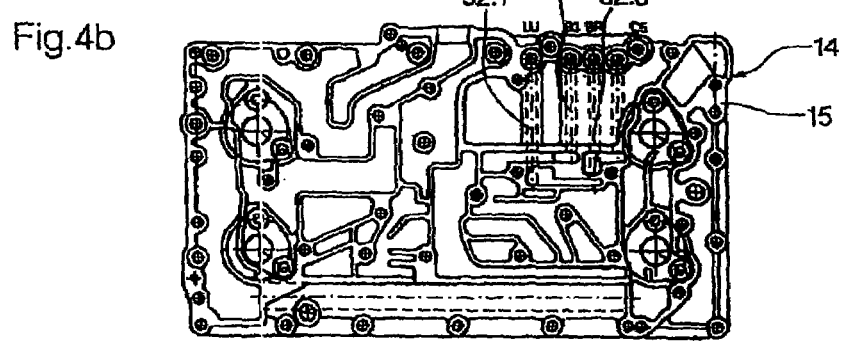

FIG. 4b illustrates a top view of the closing plate 15 of the cooling device 11, said closing plate being designed at the same time, in a particularly advantageous way, as a duct plate 14 for routing the ducts for the hydraulic control apparatus 4. Individual ducts are designated here, for example, by 32.1 to 32.N. This duct plate 14 closes the chamber 31 relative to the interior of the transmission. For this purpose, said duct plate is placed onto the wall regions 29 and can be fastened to these.

Figure 4C:
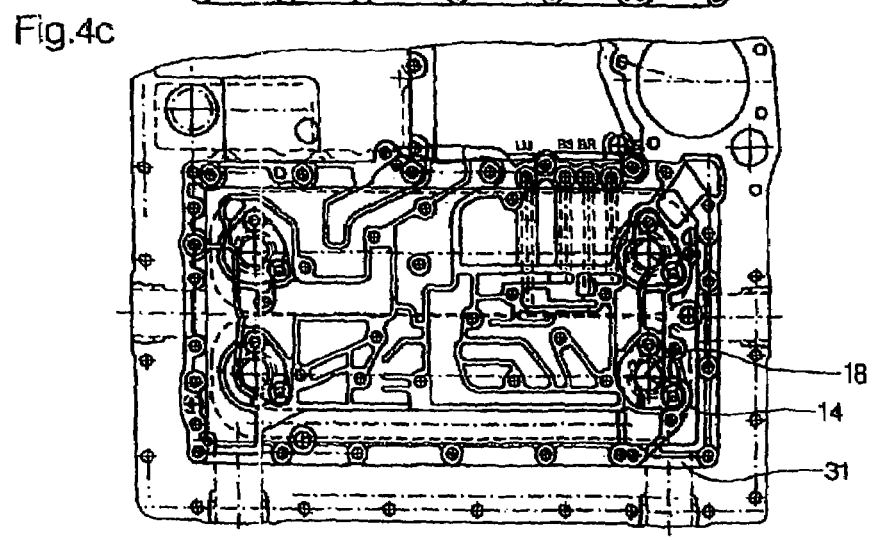

FIG. 4c illustrates at the same time a top view of the duct plate 14 mounted on the chamber 31, preferably the duct plate 14 carrying the electronic control device 18 next to the ducts 32.1 to 32.N.

The transmission unit may also include an input shaft 101 coupled to at least some of the transmission elements. The input shaft 101 may be situated at a first height in the transmission housing, and the hydraulic and electronic control apparatus may be mounted in the transmission housing below the height of the input shaft 101.

The invention claimed is:

1. A transmission unit for a transmission having a plurality of transmission elements that cooperate, the unit comprising:
   a transmission housing containing the transmission elements;
   a distribution circuit for delivering a fluid to the transmission elements located within the transmission housing;
   a hydraulic control apparatus mounted in the transmission housing and coupled to the distribution circuit and operative to selectively distribute the fluid through the distribution circuit to the transmission elements;
   an electronic control apparatus mounted in the transmission housing in direct spatial proximity to the hydraulic control apparatus and operative to control the hydraulic control apparatus;
   a cooling device mounted in the housing in proximity to the hydraulic and electronic control apparatus, the cooling device having a closing plate provided with a plurality of ducts in flow communication with the hydraulic control apparatus for routing the fluid towards the transmission elements; and
   an oil pan provided in the transmission housing, and the cooling device being in the oil pan;
   wherein the oil pan includes a wall, and a cooling device housing for the cooling device, wherein the oil pan wall defines the cooling device housing.

2. The transmission unit defined in claim 1, further comprising an input shaft to some of the transmission elements, the input shaft being at a first height in the transmission housing, the hydraulic and electronic control apparatus are mounted in the transmission housing below the height of the input shaft.

3. The transmission unit defined in claim 1, wherein the hydraulic and electronic control apparatus are mounted next to each other in a horizontal direction.

4. The transmission unit defined in claim 1, wherein the hydraulic control apparatus and the electronic control apparatus are offset from one another in a vertical direction.

5. The transmission unit defined in claim 1, wherein the cooling device is mounted in the transmission housing next to the electronic control apparatus to prevent overheating of the electronic control apparatus.

6. The transmission unit defined in claim 1, wherein the cooling device is mounted between the electronic control apparatus and the hydraulic control apparatus.

* * * * *